United States Patent [19]
Lee et al.

[11] Patent Number: 5,699,286
[45] Date of Patent: Dec. 16, 1997

[54] WAVELET TRANSFORM PROCESSOR USING A PIPELINE WITH A BIT UNIT

[75] Inventors: Heung Gyu Lee; Yun Ju Baek, both of Daejeon, Rep. of Korea

[73] Assignee: Korea Telecommunication Authority, Rep. of Korea

[21] Appl. No.: 491,622

[22] Filed: Jun. 19, 1995

[30] Foreign Application Priority Data

Jun. 18, 1994 [KR] Rep. of Korea ............... 1994-13806

[51] Int. Cl.$^6$ ............................................. G06F 7/52
[52] U.S. Cl. .................................................. 364/758
[58] Field of Search ................... 364/758, 759, 364/760

[56] References Cited

U.S. PATENT DOCUMENTS 4,369,500 1/1983 Fette ........................... 364/758
4,736,335 4/1988 Barkan ........................ 364/758
4,748,583 5/1988 Noll .............................. 364/758
5,101,372 3/1992 Heaslip ....................... 364/758

*Primary Examiner*—David H. Malzahn
*Attorney, Agent, or Firm*—Merchant, Gould, Smith, Edell, Welter & Schmidt, P.A.

[57] ABSTRACT

The present invention relates to a wavelet transform processor, and more particularly, to a wavelet transform processor using a pipeline with a bit unit, capable of being effectively used in the video processing field, the video compressing field, the video communications field, the computer vision field, and the like, by executing a high speed wavelet transform through a pipeline with a bit unit. The present invention is to provide a wavelet transform processor using a pipeline with a bit unit, which has a low complexity in circuit, high operating speed and a flexibility.

5 Claims, 4 Drawing Sheets

WAVELET TRANSFORM PROCESSOR USING A PIPELINE WITH A BIT UNIT

BACKGROUND OF THE INVENTION

1. Field of the Invention

The present invention relates to a wavelet transform processor, and more particularly, to a wavelet transform processor using a pipeline with a bit unit, capable of being effectively used in the video processing field, the video compressing field, the video communications field, the computer vision field, and the like, by executing a high speed wavelet transform through a pipeline with a bit unit.

2. Description of the Prior Art

In conventional wavelet transform processors, there are Daubechies Wavelet Transform Architecture, by Lewis and Knowles, and The Wavelet Transform processor by Aware Inc., which these wavelet transform processors regard a multiplication operation as one unit operation, and is constructed by a pipeline in a multiplier unit.

However, the former has very low complexity in the circuit, and otherwise has a shortcoming in that it does not have flexibility because it uses the structure of the Daubechies Wavelet and is limited in application by only processing a specific wavelet transform. Also, the latter has flexibility, but a shortcoming in that it has low working speed and complexity in the circuit.

SUMMARY OF THE INVENTION

An object of the present invention is to provide a wavelet transform processor using a pipeline with a bit unit, which has a low complexity in circuit, high operating speed and a flexibility.

To achieve the above object, the present invention provides a wavelet transform processor using a pipeline with a bit unit, comprising: a first group having $k^2$ unit cells which logically operate and shift each one bit of a carry input, a sum input, and transform desire k-bit data, and multiply a transform coefficient by transform desire data, so that output the results of the operation, a carry output, a sum output, said transform desire data through a pipeline; a second group having $k(k+1)/2$ full adders which logically add up each one bit of a carry input, a sum input, and transform desire k-bits data, which are outputted from each of said $k^2$ unit cells, so that output the results of the sum through a pipeline; a third group having $2k+1$ unit cells which logically add up and shift the operation results of unit cells in said first and second group, a carry input, and a control signal, so that accumulate the operation results of said unit cells in said first and second group, and output the results of the through a pipeline; a fourth group having $(k-2)(k-1)/2$ unit cells which delay said transform coefficient and the output from said unit cells in said third group, and output the results of the delay through a pipeline; and a fifth group having $(3k^2+3k+6)/2$ unit cells which delay output of said unit cells in said third and fourth group, and output the results of the delay.

DETAILED DESCRIPTION OF THE PRESENT INVENTION

Hereinafter, the present invention will be described accompanying the drawings.

Figure 1:
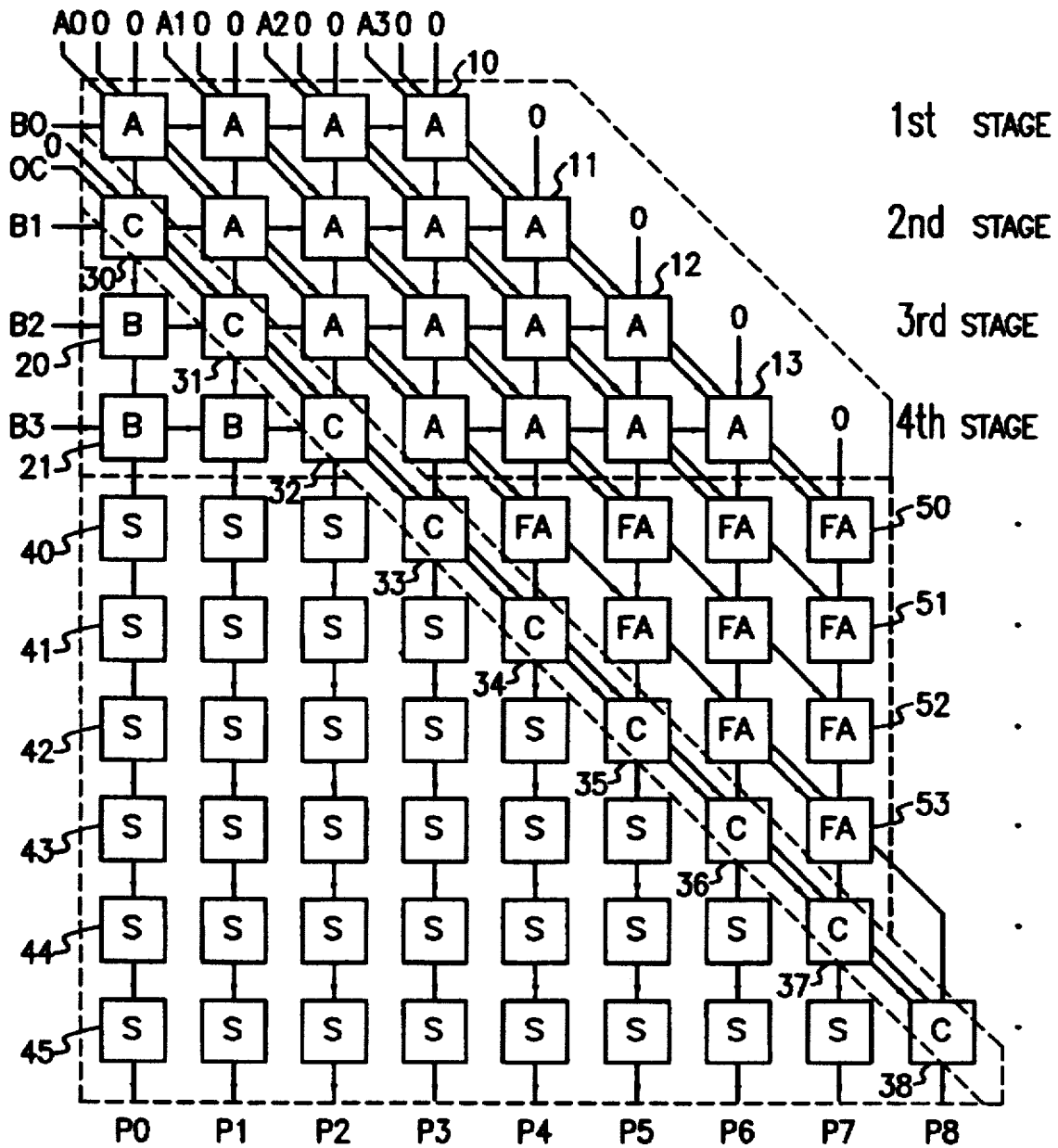
FIG. 1 is a schematic view showing an embodiment of a wavelet transform processor in accordance with the present invention.

FIG. 1 shows an embodiment of a 4-bits wavelet transform processor in accordance with the present invention. The reference number 10–13 designate a A-type unit cell, 20 and 21 designate a B-type unit cell, 30–38 designate a C-type unit cell, 40–45 designate a S-type unit cell.

In this embodiment, the operation of all the unit cells operates along with a pipeline and the pipeline operates in accordance with one system clock. That is to say, the system clock enables internal structure elements, which consist of flip-flops, and drive the pipeline.

On the other hand, the pipeline transmits data to a lower stage from an upper stage, to a next stage from a upper state, and to a next stage from a front state. That is to say, the operating results of the ith stage is transmitted to the i+1th stage and new data is inputted in the ith stage if an operation is achieved in the i+1th stage.

When transform desire data A0, A1, A2 and A3, a carry input having a size 0, a sum input and a transform coefficient B0 are applied to the A-type unit cell 10, respectively. The A-type unit cell 10 operates the transform coefficient B0 to the transform desire data A0~A3, so that the results of the above operation is applied to the A-type unit cell 11 and the C-type unit cell 30 in the second stage.

As stated above, when the results of the operation of the A-type unit cell 10 in the first stage is applied to the A-type unit cell and the C-type unit cell in the second stage, the C-type unit cell accumulatively stores the results of the operation of the A-type unit cell 10 in the first stage until the output control signal CO is high. The A-type unit cell 11 in the second stage operates a transform coefficient B1 by the results which is applied from the A-type unit cell 10 in the first stage, so that the results of the operation is applied to the A-type unit cell 12 and the C-type unit cell 31 in the third stage.

As mentioned above, the third and fourth stages operate respectively each of transform coefficients B2 and B3 by the results of the operation, which is applied from the A-type unit cell in the preceding stage, so that the results are outputted to the next stage and the results are also accumulatively stored in the C-type unit cell.

The transform coefficients B0~B3 are, in turn, operated by transform desire data A0~A3. The accumulation of data occurs 4 times in the case where the input bits are 4-bit, and the results of the accumulation is outputted thorough a pipeline in the lower stage when the control signal CO, controlling the output of the C-type unit cell, is high.

The B-type unit cell and S-type unit cell, which are connected to the C-type unit cell, take charge of the delay until the final transform output P0~P8 is outputted.

FIGS. 2 through 5 are views showing structure of unit cells used in the present invention.

Figure 2:
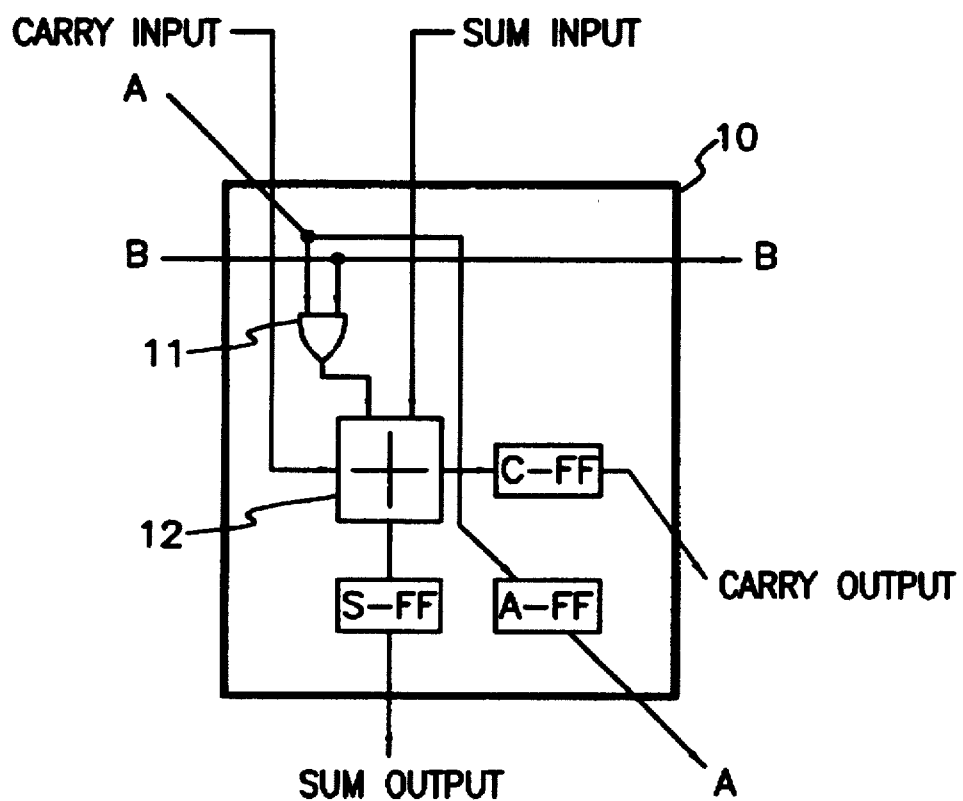
FIG. 2 is a schematic view showing the structure of the A-type unit cell in FIG. 1.

As shown in FIG. 2, the A-type unit cell 10 shifts a transform coefficient B to the next stage, after delaying the transform coefficient B for one system clock, and logically multiplies the transform desire data A by the transform coefficient B through a AND gate 14. Wherein the transform desire data A and the carry input are outputted from the processing stage. The A-type unit cell 10 adds up the output from the AND gate 14, the carry input, and the sum input from the upper stage, and outputs the results of the addition and carry output to the lower stage by delaying them for one system clock after storing them in flip-flops S-FF and C-FF, respectively.

Furthermore, the transform desire data A is outputted to the lower stage by being delayed for one system clock after being temporarily stored in a flip-flop A-FF.

Figure 3:
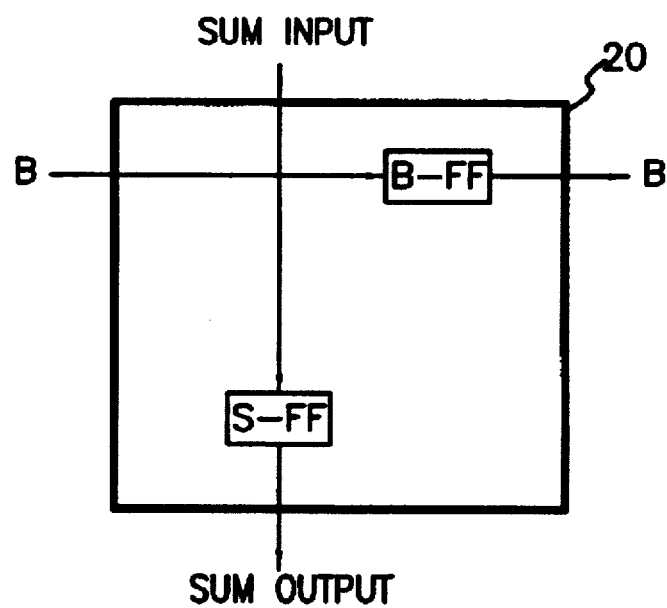
FIG. 3 is a schematic view showing the structure of the B-type unit cell in FIG. 1.

FIG. 3 shows a structure of the B-type unit cell 20. The B-type unit cell 20 outputs a transform coefficient B to the next stage by delaying it for one system clock, after temporarily storing it in a flip-flop B-FF, and outputs the sum input applied from the upper stage to the lower stage after temporarily storing it in a flip-flop S-FF.

Figure 4:
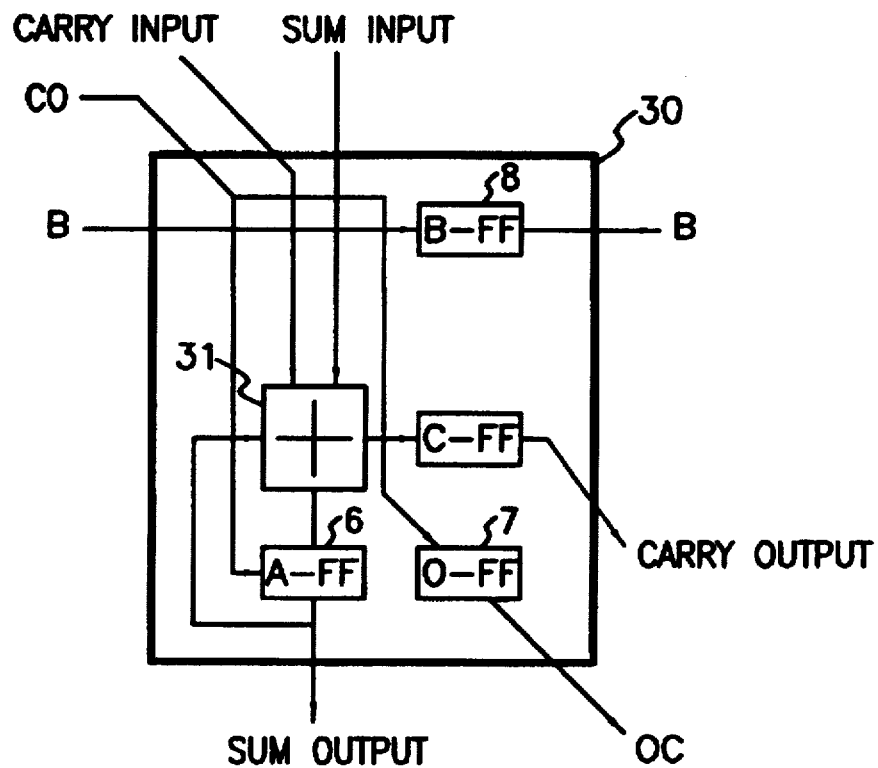
FIG. 4 is a schematic view showing the structure of the C-type unit cell in FIG. 1.

As shown in FIG. 4, the C-type unit cell 30 outputs a transform coefficient B which is applied from the preceding stage to the next stage by delaying it for one system clock after storing it in a flip-flop B-FF.

Also, the carry input, the output control signal CO, and the sum input, from a upper stage, are applied to the C-type unit cell. The output control signal CO is delayed for one system clock and outputted to a lower stage after temporarily being stored in a flip-flop O-FF. Furthermore, an adder 16 adds up the carry input, the sum input from the upper stage, and its sum output which is a output of a flip-flop A-FF delaying its sum output. The adder 31 outputs the sum output and the carry output, after storing the output of the adder 31 in flip-flops A-FF and C-FF, respectively, by delaying for one system clock.

Figure 5:
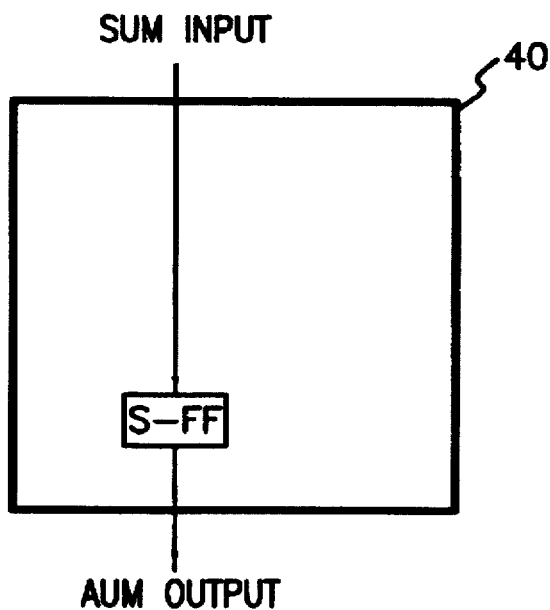
FIG. 5 is a schematic view showing the structure of the S-type unit cell in FIG. 1.

FIG. 5 shows the structure of the S-type unit cell 40. As shown in FIG. 5, the S-type unit cell outputs the sum output by delaying the sum input applied from the upper stage for one system clock after temporarily storing it in a flip-flop S-FF.

Figure 6:
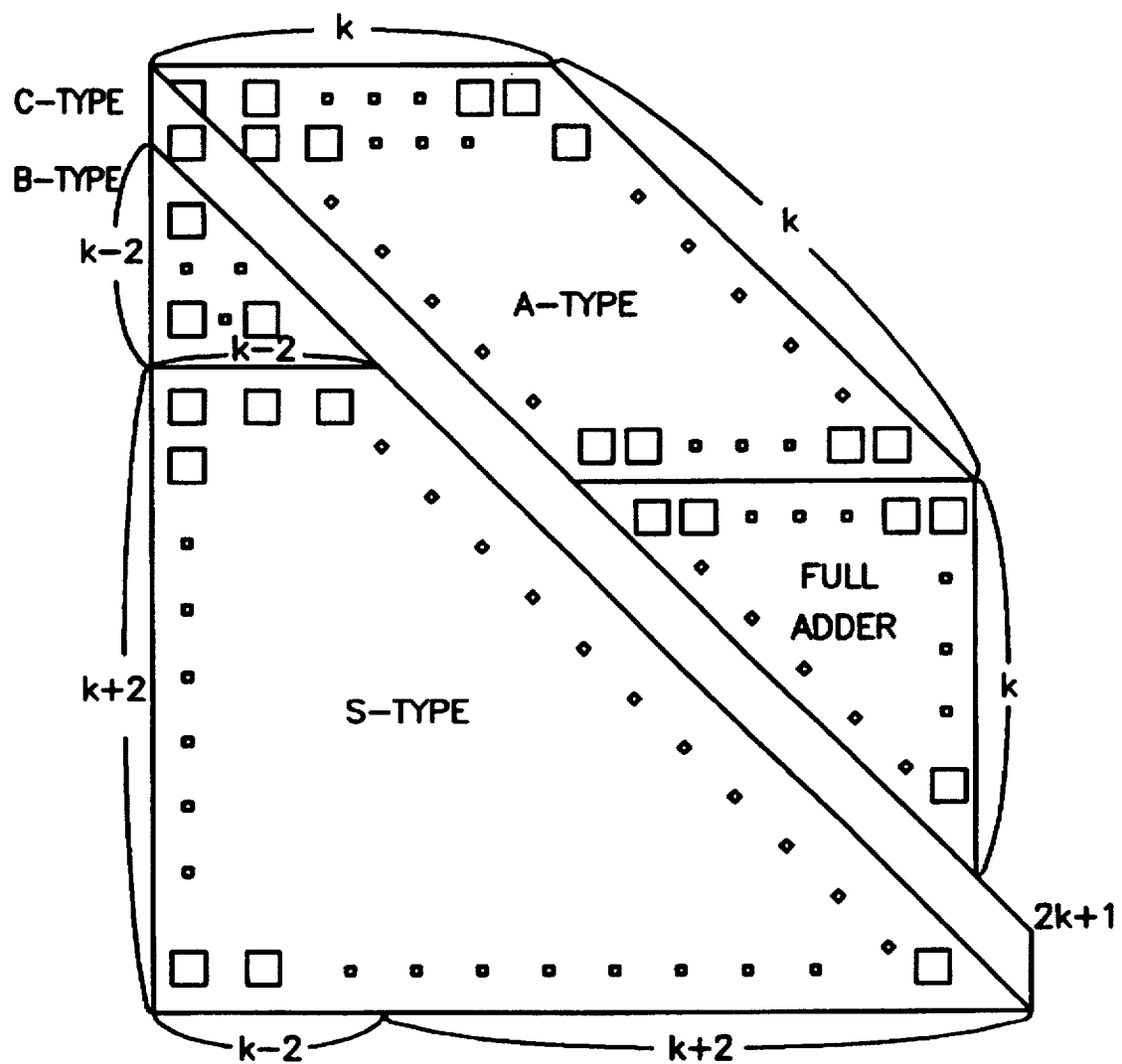
FIG. 6 is a schematic view showing the structure of connected unit cells in case where transform desire data are k-bit.

FIG. 6 shows the structure of the unit cell in the case where the transform desire data is k bits.

Although the number of bits of transform desire data and the number of transform coefficients increases and decreases, the unit cell in accordance with the present invention, copes with variation of the structure by varying the connection structure.

As mentioned hereinbefore, the present invention has low complexity of hardware by transforming a wavelet using a pipeline in a bit unit and fast operation speed because the entire operation speed is achieved approximately in the circuit delay time.

Also, the present invention has high flexibility because of processing a wavelet transform, which has a different number of transform coefficient, and can be easily embodied in a very large scale integrated circuit by having a regular structure.

Although we have described out invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

What is claimed is:

1. A wavelet transform processor using a pipeline with a bit unit, comprising:

a first group having $k^2$ unit cells which logically operate on and shift each one bit of a carry input, a sum input, and a transform k-bit data, multiply a transform coefficient by the transform data, and perform the logical operation on the result of the multiplication, the sum input and the carry input, resulting in a carry output and a sum output, where the carry output, the sum output and the transform data are output through a pipeline;

a second group having $k(k+1)/2$ full adders, having input values of one bit of a carry input, a sum input and transform k-bits data, these input values being the carry output, sum output and transform data output from said first group of unit cells, the second group logically adding up each one bit of input values and outputting the results of the sum through a pipeline;

a third group having $2k+1$ unit cells, having input values of the sum outputs of cells in the first and second groups, a carry input and a control signal, the third group of cells logically adding up and shifting the input values, to accumulate the operation results of the first and second groups of unit cells and output the results through a pipeline;

a fourth group having $(k-2)(k-1)/2$ unit cells which input and delay said transform coefficient and the output from the third group of unit cells, and output the results of the delay through a pipeline; and a fifth group having $(3k^2+3k+6)/2$ unit cells which input and delay output from the third and fourth groups of unit cells, and output the results of the delay.

2. A wavelet transform processor in accordance with claim 1, wherein said units cells in said first group comprise:

an AND gate logically for multiplying said transform data by said transform coefficient;

a first means for adding up an output of said AND gate, said sum input, and said carry input;

a first flip-flop for temporarily storing a sum of said first means;

a second flip-flop for temporarily storing said transform data; and a third flip-flop for temporarily storing a carry output from said first means.

3. A wavelet transform processor in accordance with claim 1, wherein said unit cells in a fourth group comprises:

a fourth flip-flop for temporarily storing said transform coefficient; and a fifth flip-flop for temporarily storing said sum output from said unit cells in a third group.

4. A wavelet transform processor in accordance with claim 1, wherein said unit cells in a third group comprises:

a second means for adding up said carry input, said sum output from said unit cells in said first group and said sum output from said full adder, and a sum output which is fed back from said second means;

a sixth flip-flop for temporarily storing a sum output of said second adder;

a seventh flip-flop for temporarily storing said control signal which controls said sixth flip-flop;

a eighth flip-flop for storing said transform coefficient; and a ninth flip-flop for temporarily storing said said carry output.

5. A wavelet transform processor in accordance with claim 1, wherein said unit cells in said fifth group comprises a tenth flip-flop for temporarily storing a sum output of said unit cells in third group and a fourth group.

* * * * *